(12) United States Patent
Uyttendaele et al.

(10) Patent No.: US 6,559,846 B1
(45) Date of Patent: May 6, 2003

(54) SYSTEM AND PROCESS FOR VIEWING PANORAMIC VIDEO

(75) Inventors: Matthew T. Uyttendaele, Seattle, WA (US); Richard S. Szeliski, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 266 days.

(21) Appl. No.: 09/611,987

(22) Filed: Jul. 7, 2000

(51) Int. Cl.$^7$ ............................................. G06T 17/00
(52) U.S. Cl. ...................................................... 345/473
(58) Field of Search ................................. 345/473, 474, 345/418; 348/36, 48

(56) References Cited

U.S. PATENT DOCUMENTS

| | | | | |
|---|---|---|---|---|
| 5,130,794 A | * | 7/1992 | Ritchey | 358/87 |
| 5,721,585 A | * | 2/1998 | Keast et al. | 348/36 |
| 6,141,034 A | * | 10/2000 | McCutchen | 348/36 |
| 6,356,297 B1 | * | 3/2002 | Cheng et al. | 348/36 |

* cited by examiner

Primary Examiner—Cliff N. Vo
(74) Attorney, Agent, or Firm—Lyon & Harr, LLP; Richard T. Lyon

(57) ABSTRACT

The primary components of the panoramic video viewer include a decoder module. The purpose of the decoder module is to input incoming encoded panoramic video data and to output a decoded version thereof. The incoming data may be provided over a network and originate from a server, or it may simply be read from a storage media, such as a hard drive, CD or DVD. Once decoded, the data associated with each video frame is preferably stored in a storage module and made available to a 3D rendering module. The 3D rendering module is essentially a texture mapper that takes the frame data and maps the desired views onto a prescribed environment model. The output of the 3D rendering module is provided to a display module where the panoramic video is viewed by a user of the system. Typically, the user will be viewing just a portion of the scene depicted in the panoramic video at any one time, and will be able to control what portion is viewed. Preferably, the panoramic video viewer will allow the user to pan through the scene to the left, right, up or down. In addition, the user would preferably be able to zoom in or out within the portion of the scene being viewed. The user could also be allowed to select what video should be played, choose when to play or pause the video, and to specify what temporal part of the video should be played.

61 Claims, 8 Drawing Sheets

SYSTEM AND PROCESS FOR VIEWING PANORAMIC VIDEO

BACKGROUND

1. Technical Field

The invention is related to a system and process for viewing panoramic videos, and more particularly to such a system and process that allows a user to control what portion of the scene depicted by the panoramic video is viewed, as well as letting the user to select what video should be played, choose when to play or pause the video, and to specify what temporal part of the video is played.

2. Background Art

A panoramic video is a video made up of a sequence of panoramic frames depicting a surrounding scene. Ideally, the panoramic video makes available a seamless, 360 degree, view of this scene. In this way, a person viewing the panoramic video can select different portions of the scene to view on a real-time basis. In other words, a person viewing the panoramic video on the proper viewer can electronically steer his or her way around in the scene as the video is playing.

A number of different systems for generating and viewing panoramic videos have been previously developed. For the most part, the current generating systems employ a mirror arrangement to capture the surrounding scene. For example, one existing system, referred to as a catadioptric omnidirectional camera system, incorporates mirrors to enhance the field of view of a single camera. Essentially, this system, which is described in a technical report entitled "Catadioptric Omnidirectional Camera" (Shree K. Nayar, Proc. of IEEE Conference on Computer Vision and Pattern Recognition, Puerto Rico, June 1997), uses a camera that images a hemispherical mirror to generate an panoramic still images with a 360°×210° field of view. Another similar mirror-based system unwarps a spherically distorted video produced by the mirror-and-camera rig into a rectangular video stream then encodes it using standard streaming authoring tools. The person viewing a video produced via this system sees a sub-region of the scene captured in the panoramic video and can pan within the scene. While these mirror-based single camera systems are capable of producing convincing panoramic stills and video, they can suffer from relatively low resolution when viewed and require a fairly complex camera rig to generate owing to the mirror arrangements.

Another current panoramic video system that attempts to overcome the resolution and complexity problems, foregoes the use of a mirror, and employs a multiple camera head instead to generate the panoramic video. The head consists of six cameras mounted on the six faces of a 2-inch cube, resulting in a 360°×360° field of view. The system also provides post-processing software to stitch the video streams from the individual cameras into a panorama. This multi-camera system has higher resolution than the catadioptric systems described above, but has the disadvantage of an expensive stitching stage and parallax artifacts due to the cameras not sharing a common center of projection.

One other system of note employs both a mirror arrangement and multiple cameras in an attempt to achieve a higher resolution without the stitching and parallax problems of the non-catadioptric, multi-camera system just described. Essentially, this system uses the mirror arrangement to create a common effective viewpoint for the cameras. While this system improves the resolution and reduces the aforementioned stitching and parallax problems, it still requires the use of a complex mirror-and-camera rig to generate the panoramic videos.

The present invention relates to a viewing system and process suited for playing panoramic videos such as those produced by the foregoing systems.

SUMMARY

The present invention relates to a system and process for viewing a panoramic video. The primary components of the panoramic video viewer according to the present invention include a decoder module. The purpose of this module is to input incoming encoded panoramic video data and to output a decoded version thereof. In the context of a panoramic video, the incoming video data will typically represent multiple frames of the video, or portions thereof (as will be discussed later). The incoming data may be provided over a network and originate from a server, or it may simply be read from a storage media, such as a hard drive, CD or DVD. The encoded video data might include an audio component, as well. Further, the incoming video data may be uncompressed or compressed.

In the case where the decoder will be handling compressed data with an audio component embedded therein, the following sub-architecture could be employed. The incoming data is first input into a reader. Generally, the data reader identifies the type of data and extracts the data needed for further processing. Once read, the data is then split in a splitter to extract the audio component from the video component. The audio component is then output to an appropriate audio module which processes the audio component and eventually plays it in conjunction with the display of the panoramic video frame the audio component is associated with. The video component of the data is input into a decompressor module where it is decompressed. It is noted that in the event that the incoming video data does not contain an audio component or is not compressed, the aforementioned splitter and decompressor could be bypassed or eliminated, as desired.

Once decoded, the data associated with each video frame is preferably stored in a storage module. Specifically, the storage module will store the most recently received frame data and provide it to a 3D rendering module. When the next frame (or a desired part thereof) of the panoramic video is decoded by the decoder module, it replaces the previous frame data in the memory.

The 3D rendering module is essentially a texture mapper that takes the frame data and maps the desired views onto an environment model. This is accomplished using conventional computer graphics methods. It is noted that the environment model employed by the 3D rendering module can vary depending on how the incoming video file was created. If the incoming video data requires that a specific environment model be employed by the rendering module, this information might be embedded in the incoming video data, and provided to the rendering module via the decoder module or the storage module. Or, this information could be provided in a separate initialization file, along with other information. If a separate file is provided (again either via a network and server, or directly from a storage media) it can be input and stored in an initialization module, to which all the other modules have access to retrieve any necessary data.

An example of some additional information that might be provided and stored in the initialization module is the navigation limits associated with the environment model. The navigation limits would be provided to the 3D rendering module and used to in effect limit the regions of the environment that may be visited.

The output of the 3D rendering module is provided to a display module where the panoramic video is viewed by a user of the system. Typically, the user will be viewing just a portion of the scene depicted in the panoramic video at any one time, and will be able to control what portion is viewed. Preferably, the panoramic video viewer according to the present invention will allow the user to pan through the scene to the left, right, up or down. In addition, the user would preferably be able to zoom in or out within the portion of the scene being viewed. To this end a user interface module is provided that accepts user commands via some kind of input device, such as a keyboard, mouse or joystick, and provides the user's viewing directives to the appropriate module. For example, the viewing direction and zoom directives would be provided to the 3D rendering module. In response, the rendering module would provide only those portions of the scene requested by the user to the display module. The user interface module could also be employed to accept other user commands, such as what video should be played, when to play or pause the chosen video, and allow the user to specify what temporal part of the video should be played (i.e., a seek-in-time feature). These types of commands could be forwarded to the decoding module for implementation. To this end the decoder module could include the capability of communicating with the server or storage media through an appropriate interface. For example, in the case where the panoramic video is being provided over a network, the decoder module would request the desired video from the responsible server and tell the server when to send the video data and when to stop (i.e., a pause). In addition, the decoder module could request that certain portions of the panoramic video be transmitted, rather than all the frames in sequence, thereby implementing the aforementioned seek-in-time feature.

As indicated previously, an audio module generally plays the portion of an audio component associated with the panoramic video frame that is currently being displayed by the viewer. However, it was also indicated previously that the user will be viewing just a portion of the scene depicted in each panoramic video frame. If the audio component of the incoming panoramic video is made up of audio data assigned to each panoramic frame, then the audio module simply plays audio derived from the audio data associated with the panoramic video frame from which the currently displayed portion of the scene was taken. However, if the audio component of the incoming panoramic video is made up of audio data assigned to prescribed portions of each panoramic video frame, then the audio module plays audio derived from the particular portion of the audio data assigned to the portion of the scene that is currently being viewed. If the portion of the scene being viewed is rendered from more than one of the aforementioned portions of a panoramic video frame, the audio data associated with each of these portions is blended (e.g., proportionally), and audio derived from the composited audio data is played.

It is also noted that since the viewer will typically only display a small portion of each panoramic video frame to the user at any one time, a large amount of unneeded data is being transferred in the case of a network connection. In addition, for locally stored video as well as for network connections, unneeded data must be processed. This problem can be solved by segmenting each of the panoramic video frames into regions and separately encoding the segments. In this way, it would only be necessary to decode the segments depicting the portion of the scene the user is currently viewing. Should the segmented panoramic video be available, it would be provided to the viewer in one of two preferred ways. In the first scenario, only those portions of each frame that pertain to the part of the scene the user is currently viewing would be sent to the decoder module. This can be accomplished by having the 3D rendering module provide information to the decoder module indicating what part of the scene is being viewed by the user. The decoder module would obtain only those segments of the full panoramic frame that pertain to the portion of the scene being viewed. Each segment associated with the part of each panoramic video frame that is to be shown to the user would be processed by the decoder module as described previously, and then stored in the storage module for transfer to the 3D rendering module. The rendering module would then employ conventional means to map the texture information contained in the segments onto the portion of the environment model of interest, and send the resulting image to the display module.

The other scenario would entail the data representing an entire panoramic frame being transferred to or read by the decoder module. However, only those portions representing the segments of the panoramic frame that are needed to render the desired view would be decoded and transferred to the storage module. As before, the 3D rendering module would provide information to the decoder module indicating what part of the scene is being viewed by the user. In addition, the data representing the desired portions of the panoramic video frame would be stored in the storage module for transfer to the 3D rendering module. The rendering module would employ conventional means to map the texture information contained in the files onto the portion of the environment model of interest, and send the resulting displayable image to the display module.

In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

Figure 1:
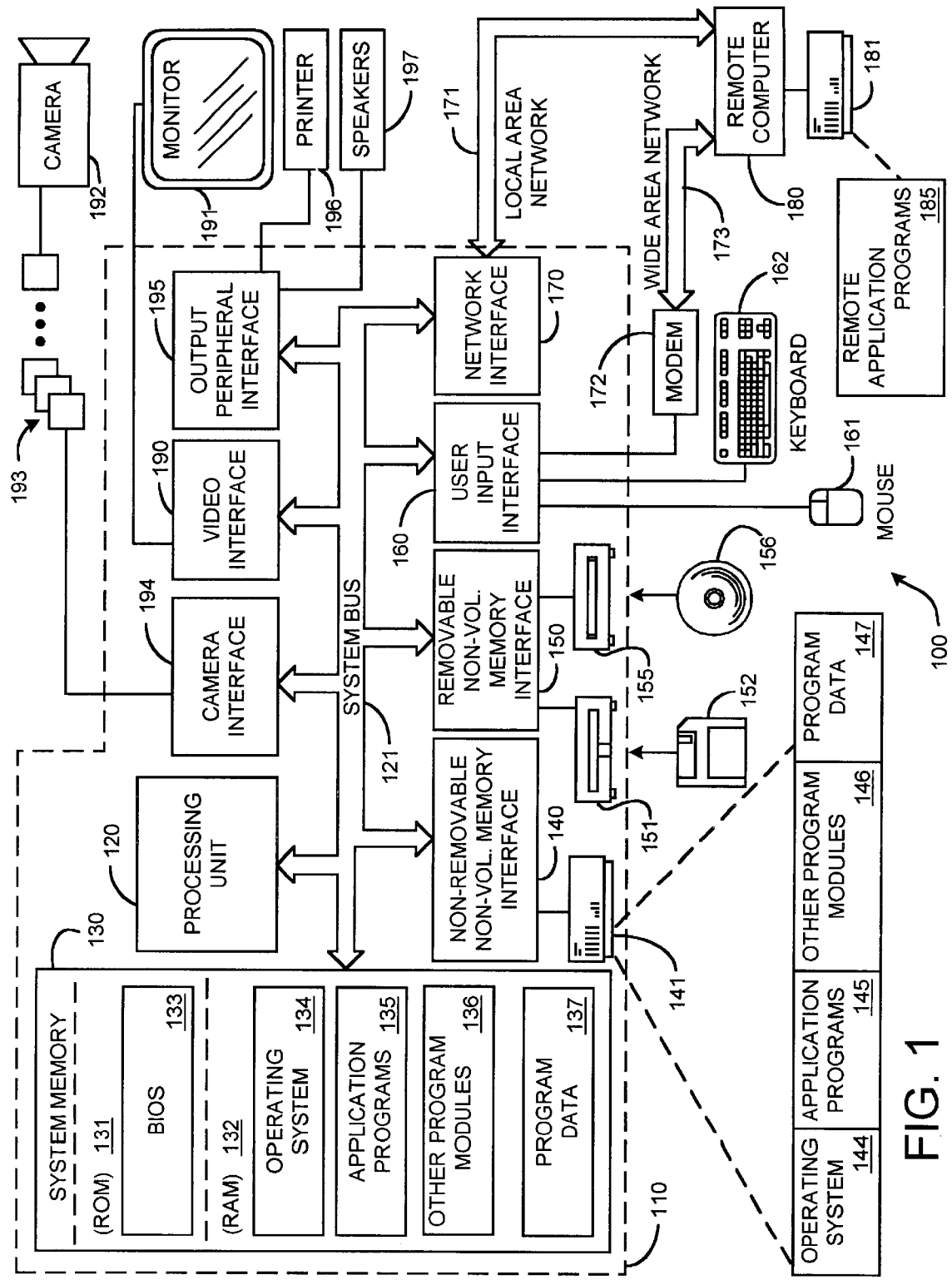
FIG. 1 is a diagram depicting a general purpose computing device constituting an exemplary system for implementing the present invention.

Before providing a description of the preferred embodiments of the present invention, a brief, general description of a suitable computing environment in which the invention may be implemented will be described. FIG. 1 illustrates an example of a suitable computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 163 (such as a digital/electronic still or video camera, or film/photographic scanner) capable of capturing a sequence of images 164 can also be included as an input device to the personal computer 110. Further, while just one camera is depicted, multiple cameras could be included as input devices to the personal computer 110. The images 164 from the one or more cameras are input into the computer 110 via an appropriate camera interface 165. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 1 10 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181.

It will be appreciated that the network connections shown are exemplary and other means of establishing a communications link between the computers may be used.

The exemplary operating environment having now been discussed, the remaining part of this description section will be devoted to a description of the program modules embodying the invention. Generally, the present invention is directed toward a system and process for viewing a panoramic video. A panoramic video ideally provides a seamless, 360 degree, view of a scene. This allows a person viewing the panoramic video to select different portions of the scene to view on a real-time basis. In other words, a person viewing the panoramic video on the proper viewer can electronically steer his or her viewpoint around in the scene as the video is playing.

1.0 Panoramic Video Viewing System Architecture

Figure 2:
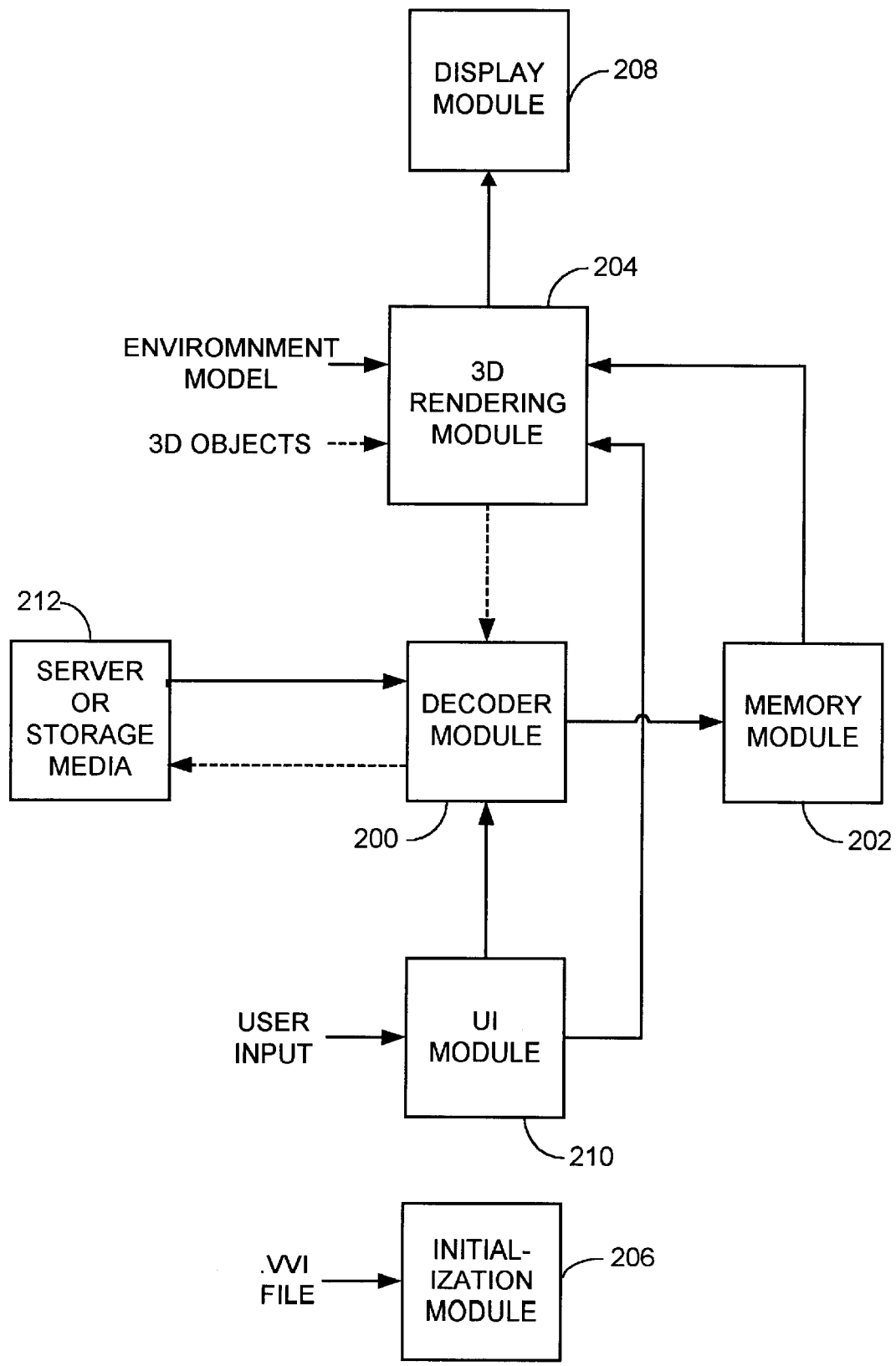
FIG. 2 is a block diagram showing the high-level program modules according to the present system for viewing panoramic videos.

Referring to FIG. 2, the primary component modules of the panoramic video viewer system according to the present invention are shown. The first of these is the decoder module 200. The purpose of this module 200 is to input incoming encoded video data and to output a decoded version thereof. In the context of a panoramic video, the incoming video data will typically represent multiple frames of the video, or portions thereof (as will be discussed later). The incoming data may be provided over a network and originate from a server, or it may simply be read from a storage media, such as a hard drive, CD or DVD. The encoded video data might include an audio component, as well. Further, the incoming video data may be uncompressed or compressed. While uncompressed data could be stored on one of the aforementioned storage media, it would be better to compress it if the data is intended to be transferred over a network (e.g., the Internet).

The output of the decoder module 200 is temporarily stored in a storage module 202. As indicated above, the incoming video will typically represent multiple frames of the video, or portions thereof. The decoder module 200 will process the data associated with each frame or frame segment in the order in which that frame or segment is to appear in the panoramic video. The storage module 202 is used to store the most recently received "frame data" and provide it to a 3D rendering module 204 when the frame or frame segment of the panoramic video associated with the stored frame data is to be rendered and played. Preferably, the storage module 202 will store the frame data associated with a single frame or a desired portion of the frame. If this is the case, when the next frame (or a part thereof of the panoramic video is processed by the decoder module 200, it replaces the previous "frame data" in the storage module 202.

As mentioned previously, each video frame (or a part thereof) stored in the storage module 202 is provided to the 3D rendering module 204. The rendering module 204 is essentially a texture mapper that takes the frame data and maps the desired views onto an environment model. This is accomplished using conventional computer graphics methods. It is noted that the environment model employed by the 3D rendering module 204 can vary depending on how the incoming video file was created. If the incoming video data requires that a specific environment model be employed by the rendering module 204, this information might be embedded in the incoming video data, and provided to the rendering module via the decoder module 200 or the storage module 204. Or, as is the case with one preferred embodiment of a co-pending application directed at the generation of panoramic video that could be played using the present viewer system, this information is provided in a separate initialization file (referred to as a .vvi file), along with other information. This co-pending application is entitled "Panoramic Video", and has the same inventors as this application and is assigned to the same assignee. The co-pending application was filed on Jul. 7, 2000 and assigned Ser. No. 09/611,646. The disclosure of this co-pending application is hereby incorporated by reference.

If a separate initialization file is provided (again either via a network and server, or directly from a storage media) it can be input and stored in an initialization module 206, to which all the other modules have access to retrieve any necessary data. An example of some additional information that might be provided and stored in the initialization module 206, in addition to the environment model data, is the navigation limits associated with the environment model. For instance, suppose that the environment model is a cube, but the video file includes only texture for the walls of the cube, and not the top or bottom faces. In that case a navigation limit would be provided to the 3D rendering module 204 and used to in effect limit the regions of the environment that may be visited. Thus, the user could only view portions of the "environment" associated with the walls of the cube.

The output of the 3D rendering module 204 is provided to a display module 208 where the panoramic video is viewed by a user of the system. The display module will preferably use a standard computer monitor to display the video images. However, other display devices could also be employed, such as a television or projector. Typically, the user will be viewing just a portion of the scene depicted in the panoramic video at any one time, and will be able to control what portion is viewed. Preferably, the panoramic video viewer system according to the present invention will allow the user to choose his or her viewing direction by panning through the scene to the left, right, up or down. In addition, the user would preferably be able to zoom in or out within the portion of the scene being viewed. To this end a user interface module 210 is provided that accepts user commands via some kind of input device, such as a keyboard, mouse or joystick, and provides the user's viewing directives to the appropriate module. For example, the viewing direction and zoom directives would be provided to the 3D rendering module 204. In response, the rendering module 204 would provide only those portions of the scene requested by the user to the display module 208, on a frame by frame basis. The user interface module 210 could also be employed to accept other user commands, such as what video should be played, when to play or pause the chosen video, and allow the user to specify what part of the video in time should be played (i.e., a seek-in-time feature). These types of commands could be forwarded to the decoding module 200 for implementation. To this end the decoder module 200 could include the capability of communicating with the server or storage media 212 through an appropriate interface (as indicated by the dashed arrow in FIG. 1). For example, in the case where the panoramic video is being provided over a network, the decoder module 200 would request the desired video from the responsible server 212, tell the server when to send the video data and when to stop (i.e., a pause). In addition, the decoder module 200 could request that certain portions of the panoramic video be transmitted, rather than all the frames in sequence, thereby implementing the aforementioned seek-in-time feature.

Figure 3:
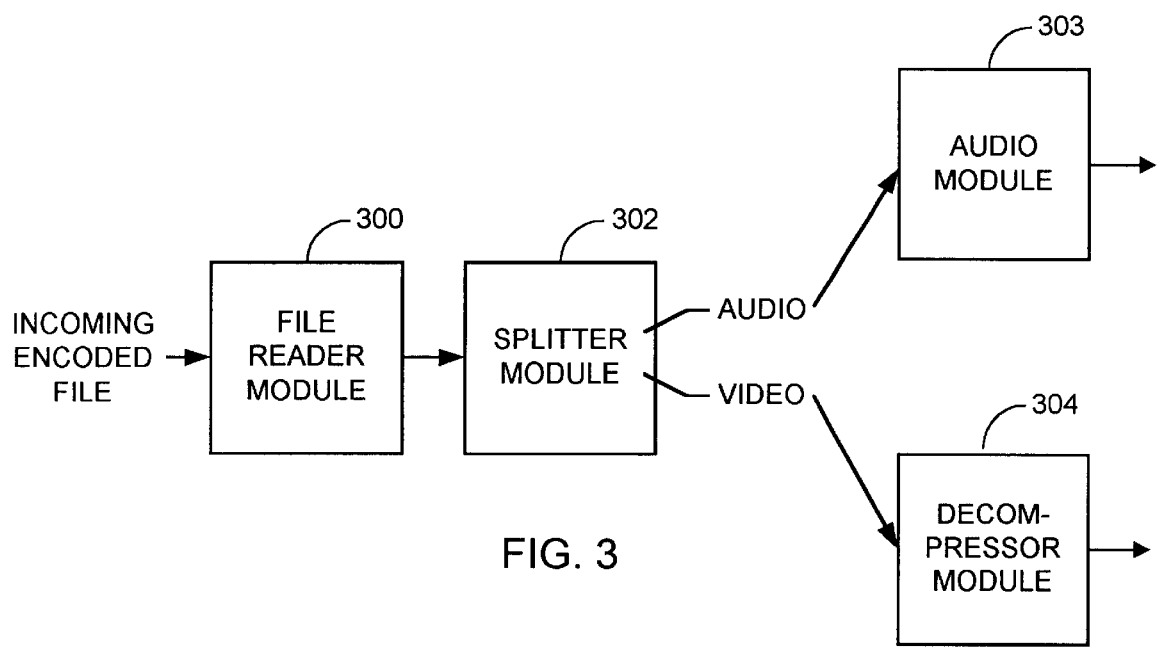
FIG. 3 is a block diagram showing sub-modules associated with the decoder module of FIG. 2.

In the case where the decoder module will be handling compressed files with an audio component embedded therein, the sub-architecture of FIG. 3 could be employed. As shown in FIG. 3, the incoming data is first input into a reader 300. Generally, the reader 300 identifies the incoming data as panoramic video data and extracts the data needed for further processing. While not shown in FIG. 3, if the panoramic video or audio data is split into multiple data files, it is expected that multiple readers of the type shown in the figure would be used. Once read, the data is then split in a splitting module 302 to extract the audio component from the video component. The audio component is then output to an appropriate audio module 303 which processes the audio component. In general, the audio module plays the portion of the audio component associated with the panoramic video frame that is currently being displayed by the viewer. As described in the aforementioned co-pending application entitled "Panoramic Video", the audio component can take a variety of forms. In one embodiment, the audio component is derived from a recording made by one of the video cameras in the camera rig used to capture the images that were employed to create the frames of the panoramic video. In another embodiment, the audio component is derived from a composite of the recording of two or more of the cameras in the camera rig. In either of these first two embodiments, the portion of the audio data forming the audio component of the panoramic video that was recorded contemporaneously with the capture of the images making up each panoramic video frame is assigned to that frame. Thus, the audio module 303 of the panoramic video viewer simply plays the portion of the audio data assigned to the panoramic video frame that is being displayed. It is noted that typically only a portion of each panoramic video frame will be displayed. However, when the audio component is embedded into the panoramic video data using either of the aforementioned first two embodiments, there is no distinction made as to what portion of the panoramic video frame is displayed. In other words, the portion of the audio data assigned to the panoramic video is played regardless of which part of that frame is being displayed. This is not the case, however, if the audio component is added to the texture map data using multiple audio tracks, each of which is representative of the environmental sounds that would be heard by an observer when viewing a particular portion of the scene. In this latter embodiment, which is also described in the aforementioned co-pending application, the sound recorded for a particular portion of the scene would be assigned to the texture map data representing that portion, on a temporal basis. In other words, the sound recorded at the time each image of the scene is captured by one of the cameras would be assigned to the portion of the texture map data derived from that image. The audio module 303 decodes this audio data and plays the particular portion of the data assigned to the portion of the scene that is currently being viewed. If the portion of the scene being viewed cuts across the regions captured by adjacent cameras of the camera rig, the audio module blends the audio data assigned to each region via conventional audio compositing methods and plays this composited audio in conjunction with the texture maps associated with that part of the scene. One way of accomplishing the foregoing blending would be to combine the audio data associated with each region in proportion to the amount of the scene being viewed that is attributable to the region associated with the audio data.

The video component of the data is input into a decompressor module 304 where it is decompressed. It is noted that any conventional video compression method could be used to compress the panoramic video frame data. In view of this, the decompressor module could be designed to decompress a specific type of compressed data. In such a case, the viewing system would be limited to handling just those panoramic videos employing that type of compression. However, it is preferred that the decompressor module be designed to identify and decompress data compressed using a variety of the most popular compression algorithms. In this way, the system would be able to display a wider range of compressed panoramic videos. Once decompressed, the data associated with the current video frame is transferred to the aforementioned storage module (202 of FIG. 2). It is noted that in the event that the incoming video data does not contain an audio component, or is not compressed, the aforementioned splitting module 302, audio module 303, and/or decompressor module 304 could be bypassed or eliminated, as desired.

2.0 Panoramic Video Viewing Process

Figure 4:
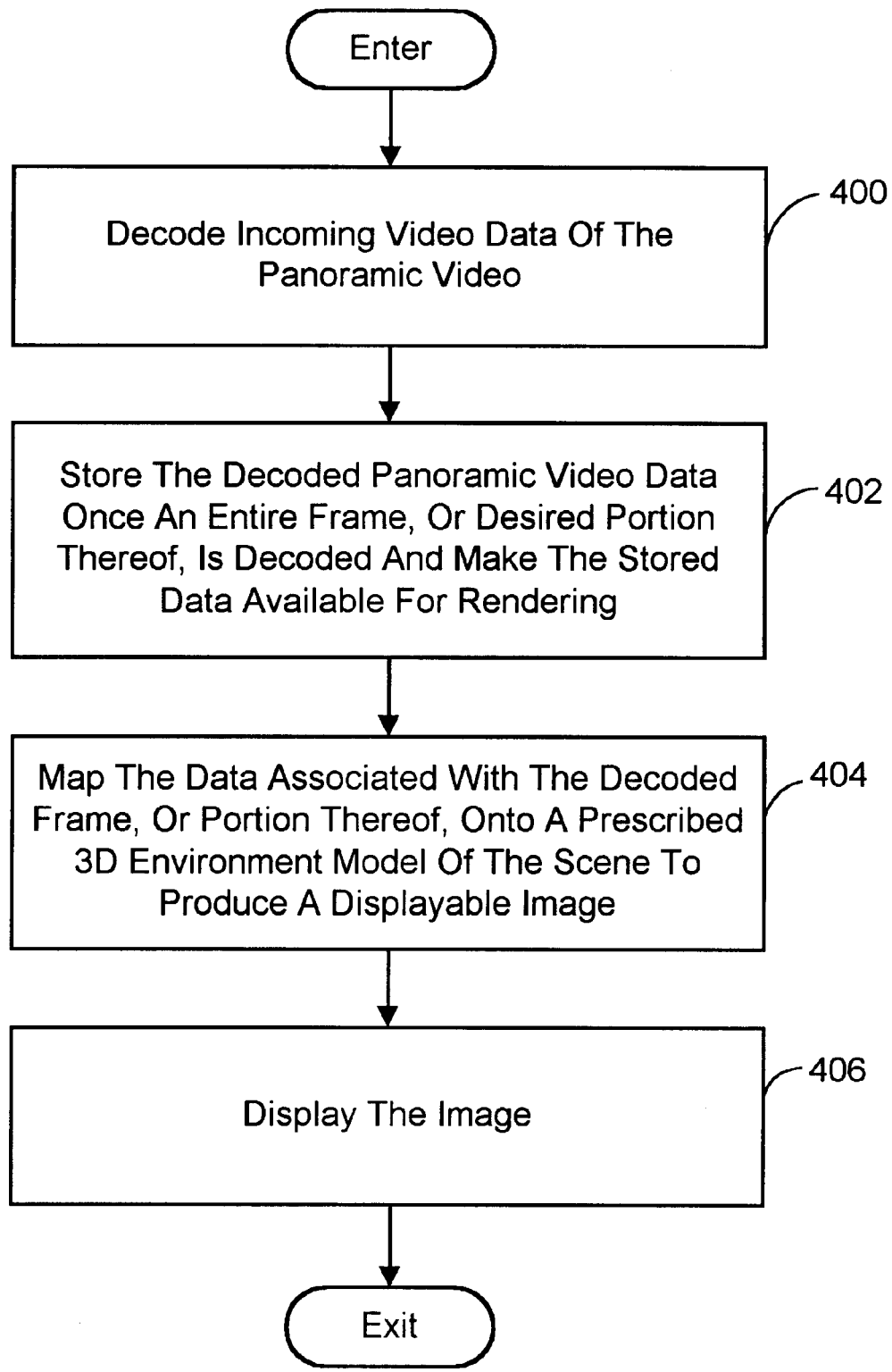
FIG. 4 is a flow chart diagramming an overall process for viewing panoramic videos according to the present invention.

In general, the above-described panoramic video viewing system operates via the following process, as outlined in the high-level flow diagram of FIG. 4. First, incoming video data representing at least a portion of a frame of the panoramic video is decoded (process action 400). This is accomplished using the previously-described decoding module. Next, once an entire frame, or a desired portion thereof, of the panoramic video is decoded, it is stored and made available for rendering (process action 402). The aforementioned storage module is employed to accomplish this task. The decoded frame, or portion thereof, is then rendered by mapping it onto a prescribed 3D environment model of the scene to produce a displayable image (process action 404). This is accomplished using the aforementioned 3D rendering module. Then, the resulting image is displayed (process action 406). The previously-described display module is used for this purpose.

In regard to the decoding an incoming panoramic video data, while the incoming data will at least represent a portion of a frame of the panoramic video, it is envisioned that the incoming data will represent multiple frames of the panoramic video (or portions of multiple frames as will be discussed later). This is the case with the panoramic video data generated according to the process described in the aforementioned co-pending patent application entitled "Panoramic Video". In that application, information about the panoramic video data or the data itself, among other things, is provided as elements of a specialized initialization file referred to as a .vvi file.

More specifically, the .vvi file contains data associated with texture maps representing the panoramic video frames, or at least a pointer as to where this data can be found or obtained. In regards to the use of pointers, if the panoramic video were stored on a medium of some type (e.g., hard drive, CD, DVD, and the like) that is directly accessible by the viewing system, then the pointers would identify where on the medium the viewing system can obtain each file as needed. In addition, the .vvi file would preferably indicate the order in which the associated data should be played. For example, the sequence in which the frame data or pointers are provided could indicate this playing order. Thus, the viewing system would access the data associated with one frame of the panoramic video, and then that associated with the next frame, and so on. The situation is similar if the panoramic video is provided over a network connection, with the exception that the pointers would refer to data that is fed to the viewing system from a server after the .vvi file is provided. In addition, the frame data may be compressed, as would typically be the case when a network connection is involved. If the frame data is compressed, the vvi file would contain the compressed data (or pointers thereto) as elements.

The viewing system also needs to know the shape of the environment model used to create the texture maps representing the panoramic video frames. This information is needed because if a different model were assumed during the rendering of the scene from the texture maps, distortion could result. And finally, the viewer should be informed of the aforementioned navigation limits, if any. The environment model information and navigation limits are also provided in the .vvi file.

It is noted that the present panoramic viewing system and process is not limited to just playing panoramic videos produced using the methods of the aforementioned co-pending patent application. However, whatever system is employed to produce the panoramic video would preferably provide the panoramic video frame data in a way similar to the co-pending application. Namely, the actual texture map data representing each frame (or portion thereof) of the panoramic video, or pointers to this data, as well as the environment model information, and optionally any navigation limits. It is further noted that the environment model information and any navigation limits provided to the viewing system would preferably be stored in the aforementioned initialization module and made accessible to the 3D rendering module. In addition, if the panoramic frame data is represented in the .vvi file, or its like, as pointers, the pointer information could also be stored in the initialization module for access by the decoding module.

The navigation limits provide information as to the regions of the scene that the 3D rendering module will display to a person viewing the panoramic video. This is done when the frames of the panoramic video lack texture maps representing certain areas of the surrounding scene. For example, an exemplary camera rig used to capture videos of the surrounding scene in tested embodiments described in the aforementioned co-pending application, did not capture the portion of the scene above and below the longitudinal field of view of the cameras employed in the rig. This resulted in texture maps representing the frames of the panoramic video that omitted those portions of the scene beyond the longitudinal field of view of the cameras. However, rather than, or in addition to, providing navigation limits in the .vvi file (or its equivalent), it would also be possible to provide static texture maps that cover all or some of the regions missing in the panoramic video frame data. For example, in the context of the tested embodiments described in the co-pending application, static texture maps representing the regions above and below the longitudinal filed of view of the camera rig could be provided in the .vvi file, or at least pointers to these texture maps. Any static texture map provided would be used by the viewing system as an addendum to all the panoramic video frames. For example, suppose the scene captured in the panoramic video was a room. The ceiling of the room would typically not change throughout the video. Therefore, a static image of the ceiling could be provided and displayed by the viewer, should the user want to pan up past the data provided by the panoramic video frames.

In regard to the storing of the decoded panoramic frame data, the decoder module receives or obtains the texture map data that represents the frames of the panoramic video, or at least a portion of each frame, and processes them in the order in which they are to be played. Thus, the decoder module is involved in an ongoing decoding process until the last frame of the video is processed. However, the 3D rendering module operates by rendering one frame (or a portion thereof) at a time and providing a viewable image to the display module. In order to simplify the delivery of the texture map data associated with each frame, on a frame-by-frame basis to the 3D rendering module, the aforementioned storage module is employed. Essentially, once the decoder module has completed the decoding of an entire frame, or a desired portion of the frame, it transfers the texture map data to the storage module where it is accessed by the 3D rendering module. The decoder module continues decoding subsequent frames of the video, and when an entire frame (or desired portion thereof) is decoded it is provided to the storage module. This new frame data replaces the previously stored data. In this way, the texture maps associated with just one frame, or a desired portion thereof, is made available to the 3D rendering module at any one time.

In regard to the rendering of a displayable image and its display to a user of the present system, it was described previously that the 3D rendering module obtained the texture map data associated with the "current" frame (or portion thereof from the storage module, and the environment model information from the initialization module. The 3D rendering module may also access any navigation limit information and/or any static texture maps from the initialization module as part of rendering the displayable image. Conventional computer graphics methods are then employed to produce a viewable image by mapping the texture data onto the environment model, and providing the image to the display module. However, in addition to these functions, the 3D rendering could also be employed to add objects into the scene captured in the panoramic video. Referring once again to FIG. 2, in addition to mapping the video frame texture data and any static texture data onto the environment model, it would also be possible for the 3D rendering module 204 to input and render additional 3D objects. Conventional compositing techniques would be employed to accomplish the insertion task. In this way, objects not originally present in the panoramic video could be added to the scene viewed by a user of the system. As this feature of the system is optional, it is shown as being input into the rendering module 204 with a dashed-line arrow.

3.0 User Input

Figure 5A:
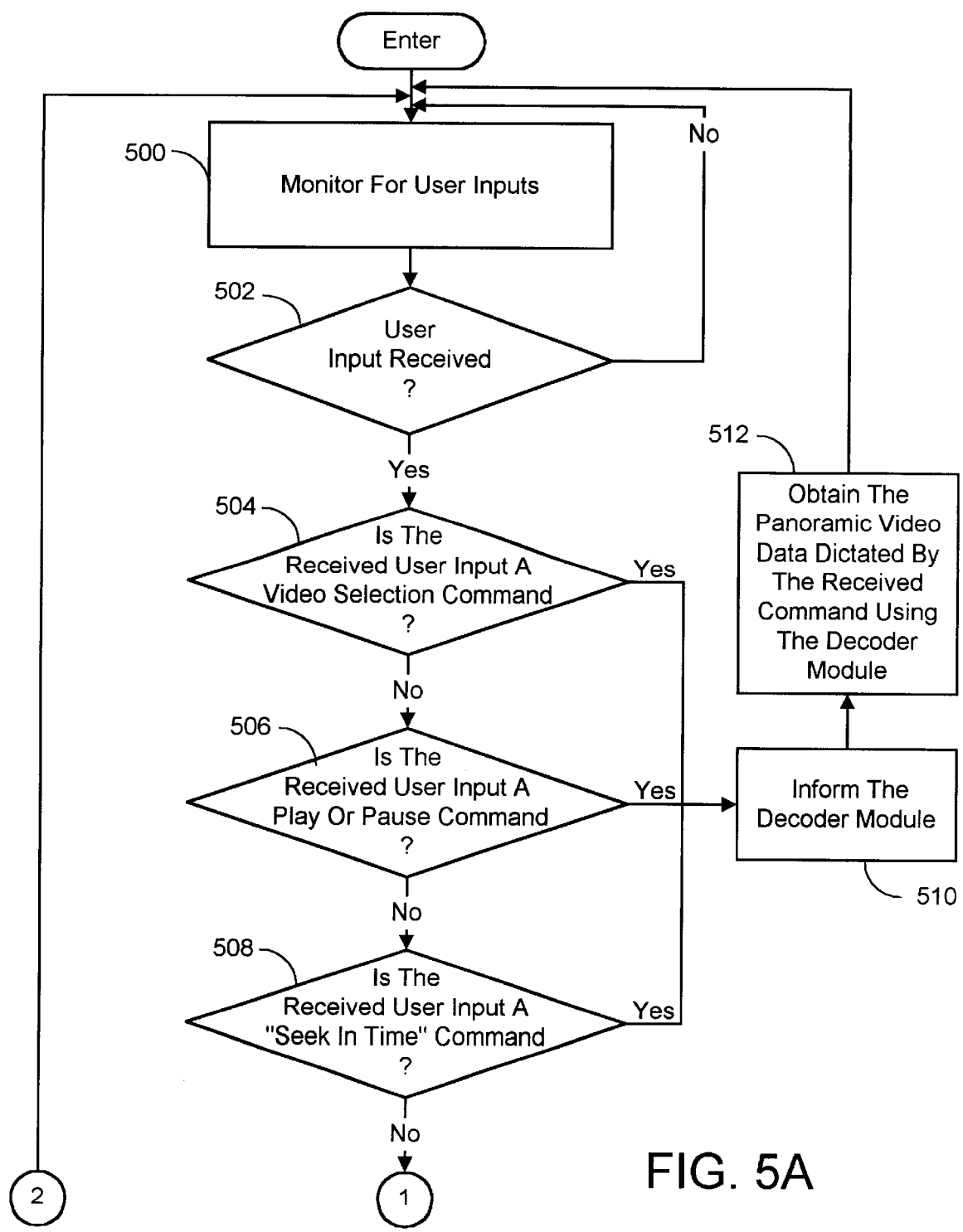
FIGS. 5A and 5B are flow charts diagramming one way in which user commands could be handled by the user interface module of FIG. 2 in cooperation with the other modules.
Figure 5B:
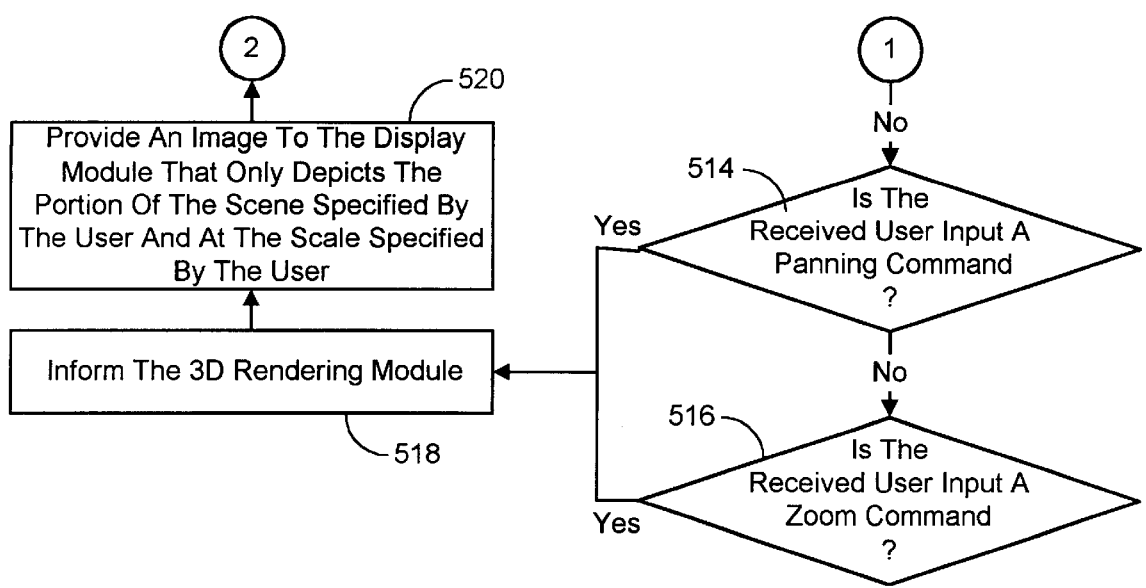

While it is possible that the viewing system could display an image of an "unwrapped" version of the entire frame of the panoramic video, or an image of some prescribed portion of each frame, it is preferred that the person viewing the video have control over what part of the scene is displayed at any one time. In addition, it is desirable that the user have control over what panoramic video is played, when it plays and when it is paused, and what temporal part of the panoramic video is played. This is where the aforementioned user interface module comes into play. The flow diagram of FIGS. 5A and B, outlines one way in which user inputs could be handled by the user interface module in cooperation with the other modules of the system. Assuming the following process begins when the present panoramic video viewing system is activated, and ends when the system is shut down, the first process action 500 involves monitoring for user inputs. As discussed earlier, any type of input device (e.g., a keyboard, mouse or joystick) could be used by the person using the system to input commands. Additionally, it is envisioned that the user interface module would provide an appropriate graphical interface that is displayed to the user. For example, this interface could be provided on the same display device employed by the display module to display the panoramic video. The user would use the aforementioned input device or devices to select items in the graphical interface representing the various user commands. The monitoring action continues until a user input is detected as indicated by process action 502. When a user input is received, it is first determined if it is a video selection command (process action 504). This command would specify what panoramic video among those available, the user wishes to be played. To this end, it would be advantageous for the user interface module to provide a list of available panoramic videos to the user via the graphical interface. One way of accomplishing this task is to include a designator in the previously-described .vvi file, or its like, that provides identifying information about the associated panoramic video (e.g., title, subject, length, etc.). If this were the case, then the user interface module could obtain the identification information from the initialization module. Further, while the previous description of the initialization module implied it contained just one .vvi file or the like, this need not be the case. The initialization module could contain several of such files. Thus, the user interface module would be able to provide a list of multiple panoramic video files that are available to the user.

If the detected user input is not a panoramic video selection command, then it can be assumed that a video is already been selected. Given this, the next process action 506 involves determining if the received user input is a play or pause command. If it is not, then it is determined if the user input is a seek-in-time command (process action 508). As stated earlier, a seek-in-time command specifies that a particular part of the panoramic video be played.

Whenever, it is determined that the user input is a video selection, play/pause, or seek in time command, this information is provided by the user interface module to the decoder module (process action 510). In general, as indicated by process action 512, the decoded module obtains the panoramic video frame data dictated by the user command. For example, if the user input is a video selection command, the decoder module would obtain the frame data associated with the selected video. The present system could be set up to begin "playing" the selected panoramic video upon its selection, or it could be designed to wait until a play command is received. Once the selected panoramic video is playing, if a pause command is received, then the decoder module would temporarily stop processing the frames of the video. The processing would resume once the play command is received. If a seek-in-time command is received, then the decoder module would obtain and begin processing the frame data associated with the temporal location in the panoramic video specified by the user.

Once the decoder module has been informed of the receipt of one of the foregoing commands, the monitoring action is continued until the next user input is detected. If, however, the detected user input is not one of the foregoing commands, then it is determined whether it is a panning command (process action 514). As described previously, the user preferably has the capability to choose his or her viewing direction within the scene depicted by the panoramic video. The panning command specifies this viewing direction. If it is discovered that the detected user input is not a panning command, then it is determined if a zoom command has been received (process action 516).

Whenever it is determined that a panning or zoom command has been received, this information is provided to the 3D rendering module (process action 518). In response, the 3D rendering module will provide an image to the display module that only depicts the portion of the scene specified by the user and at the scale specified by the user (process action 520). It is noted that prior to receiving the first user-specified panning command, the 3D rendering module could be designed to provide an image of a prescribed portion of the scene. Once the rendering module has been informed of the receipt of a panning or zoom command, the monitoring action is resumed until the next user input is detected. At that point the foregoing process (i.e., actions 502 through 520) is repeated for as long as the system is activated.

4.0 Segmented Frame Data

One issue that has not been addressed so far is that since the panoramic viewing system will typically display only a small portion of the scene depicted in each panoramic video frame at any one time, a large amount of unneeded data is being transferred and processed. The transfer problem is particularly acute in the case of a network connection as this unneeded data must be sent over the network to the viewing system, thereby wasting network resources. In addition, for locally stored video as well as for network connections, unneeded data must be processed and stored. However, this problem can be solved by segmenting each of the panoramic video frames into regions and separately encoding the segments. In this way, it would be possible to transmit and/or decode only those segments depicting the portion of the scene the user is currently viewing.

A preferred technique for segmenting the frames of a panoramic video to facilitate their transfer and processing is the subject of a co-pending patent application entitled "System and Method for Selective Decoding and Decompression of Panoramic Video", which has the same inventors as this application and which is assigned to a common assignee. The co-pending application was filed on Jul. 7, 2000 and assigned Ser. No. 09/611,649. The disclosure of this co-pending application is hereby incorporated by reference. In the co-pending application, each frame is segmented into a plurality of regions. The segmenting from frame to frame is done in the same way so that the segmented regions correspond from one frame to the next. Each segmented region is then encoded separately, which may include compressing each segment or corresponding series of segments. Once the panoramic video frames have been segmented, compressed (if desired), and encoded, they are ready for transfer to a panoramic video viewing system, such as the one described in the present application.

Should the segmented panoramic video be available, one way to transfer the segmented frame data involves the use of an interactive approach over a network connection. In this scenario, only those portions of each frame that pertain to the part of the scene the user is currently viewing would be transferred to the decoder module. Essentially, the decoder module would request a network server to provide only those segments of the panoramic video frames that are needed to produce the desired view of the scene to the user.

Figure 6:
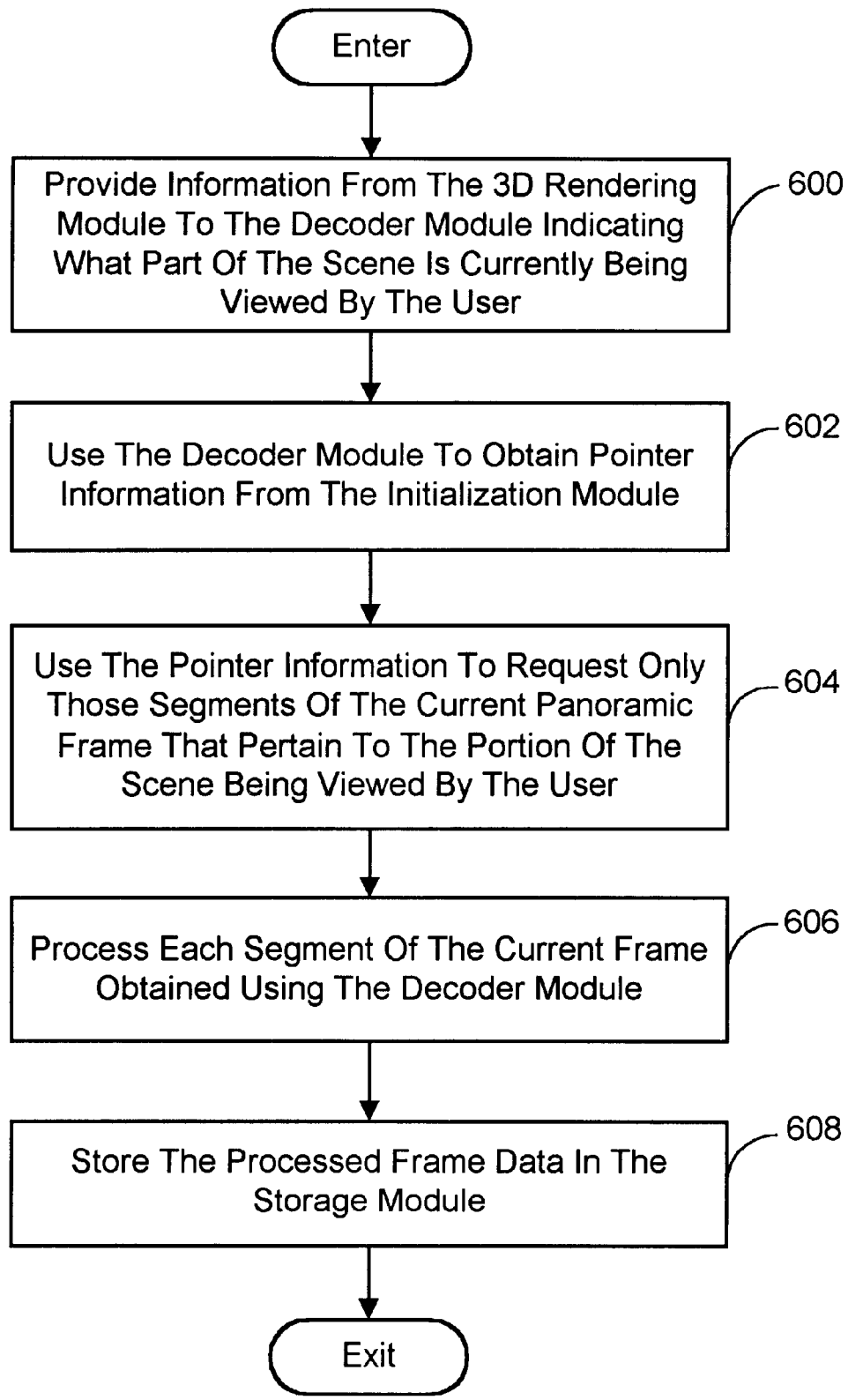
FIG. 6 is a flow chart diagramming an interactive process used to obtain, decode and store segmented panoramic video data that is provided over a network connection, as part of the decoding and storing program modules of the overall process of FIG. 4.

More specifically, referring to FIG. 6, the 3D rendering module provides information to the decoder module indicating what part of the scene is currently being viewed by the user (process action 600). Thus, referring to FIG. 2, an optional communication link is provided between the rendering module 204 and the decoder module 200, as represented by the dashed-line arrow. Additionally, in order to assist the panoramic video viewing system in identifying which of the desired segmented regions of each panoramic video frame should be transferred, a particular data structure can be adopted. Essentially, the previously-described embodiment of the .vvi file, or its like, employing pointers to the panoramic video data would be modified to include pointers to each segment of each frame, rather than to the data associated with the whole frame.

Referring again to FIG. 6, the decoder module would obtain this pointer information from the initialization module (process action 602) and use it to request only those segments of the current panoramic frame that pertain to the portion of the scene being viewed (process action 604). Depending on how finely the frames of the panoramic video are segmented, and whether the portion of the scene being viewed by the user cuts across the segment boundaries, more than one segment may have to be requested to provide the desired view. The requested segment or segments representing the desired portion of the panoramic video frame would be transferred to the decoder module. Each segment of the current frame obtained would then be processed by the decoder module as described previously (process action 606), and collectively stored in the storage module (process action 608) for transfer to the 3D rendering module.

It is noted that while the foregoing process could be implemented on a frame by frame basis, realistically, multiple frames will be involved in providing each view dictated by the user. In other words, the user will not typically be changing his or her viewpoint fast enough to require different segments to be requested for each frame. As a result, the viewing system can be configured such that the decoder module requests segments on a standing order basis. Thus, the segments needed to provide the desired image to the user would be ordered and these same segments would be provided for each frame of the panoramic video in sequence until the user changes his or her viewpoint to the extent that different segments are required to render the desired view. When this occurs, the decoder will make another standing order for particular segments of each frame. This process continues for as long as the video is being viewed. Thus, in actuality, the server will be expected to provide one or more continuous video streams, each of which is made up of corresponding segments from each consecutive panoramic frame.

Figure 7:
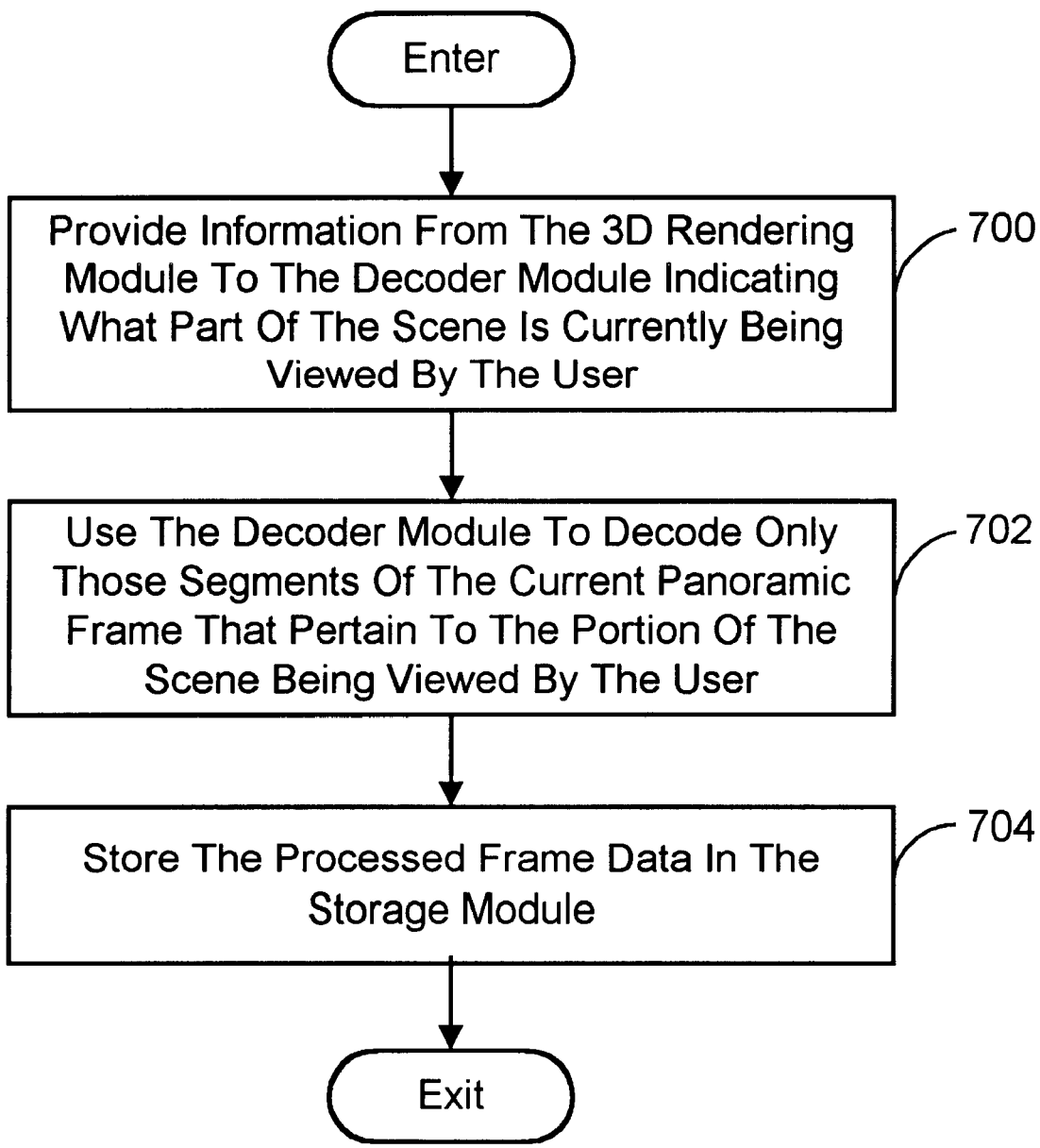
FIG. 7 is a flow chart diagramming a non-interactive process used to obtain, decode and store panoramic video data that is provided over a network connection or read from a directly accessible storage medium, as part of the decoding and storing program modules of the overall process of FIG. 4.

In some circumstances an interactive approach will not be desired or possible. However, the segmented frame scheme still has advantages. Granted, all the data associated with each segmented region of a panoramic frame must be sent to the viewing system, as there would be no feedback as to which regions are needed. However, once received, only those segments representing the portion of the panoramic frame that are needed to produce the desired view would be processed. Specifically, referring to FIG. 7, the. 3D rendering module would provide information to the decoder module indicating what part of the scene is being viewed by the user (process action 700). The decoder module would then only decode the needed segments of each frame (process action 702) and transfer them to the storage module (process action 704). Thus, the processing and storage requirements of the viewing are reduced. The same advantages can be obtained no matter if the segmented panoramic frame data is received over a network connection or read off of a directly connected storage media.

Wherefore, what is claimed is:

1. A system for viewing a panoramic video, comprising:
   a decoder module that is in two-way communication with a source of encoded video data, and which inputs said encoded panoramic video data from the source and outputs a decoded version thereof;
   a 3D rendering module which is capable of rendering displayable images of a scene captured by the panoramic video using the decoded panoramic video data output from the decoder module and a prescribed 3D environment model; and
   a display module which is capable of displaying the displayable images rendered by the 3D rendering module on a display.

2. The system of claim 1, further comprising a storage module which is capable of storing the decoded panoramic video data output from the decoder module and making the data accessible to the 3D rendering module.

3. The system of claim 2, wherein the encoded panoramic video data represents multiple frames of a panoramic video.

4. The system of claim 3, wherein each time the decoder module decodes a portion of the encoded panoramic video data representing a single frame of the panoramic video, it provides that portion to the storage module, and wherein the storage module stores only said portion of the decoded panoramic video data representing a single frame of the panoramic video at any one time.

5. The system of claim 4, wherein newly decoded panoramic video data representing a single frame of the panoramic video replaces previously stored panoramic video data in the storage module.

6. The system of claim 1, wherein the encoded panoramic video data represents multiple frames of a panoramic video, and wherein the decoder module comprises a panoramic video reader which identifies incoming data as encoded panoramic video data and extracts that part of the data representing the frames of the panoramic video.

7. The system of claim 6, wherein the encoded panoramic video data comprises an audio component associated with each frame of the panoramic video, and wherein the decoder module comprises a splitter module which extracts said audio component from the data associated with each frame of the panoramic video after the data is processed by the reader.

8. The system of claim 6, wherein the encoded panoramic video data is compressed, and wherein the decoder module comprises a decompressor which decompresses the panoramic video data after the data is processed by the reader.

9. The system of claim 1, wherein the prescribed environment model is specific to the inputted panoramic video data and information defining the environment model is included in that data, and wherein the information defining the environment model is extracted from the encoded video data by the decoder module and provided to the 3D rendering module for use thereby.

10. The system of claim 1, wherein the prescribed environment model is specific to the inputted panoramic video data and information defining the environment model is provided to the system in an initialization data file.

11. The system of claim 10, further comprising an initialization module which is capable of storing the initialization data file containing the information defining the environment model, said initialization module being accessible by the 3D rendering module.

12. The system of claim 11, wherein the initialization data file further comprises information defining navigation limits associated with the encoded panoramic video data, said navigation limits identifying regions of the environment model that have panoramic video data available to characterize them, and wherein the 3D rendering module only produces displayable images associated with the regions of the environment model having data available to characterize them.

13. The system of claim 1, further comprising a user interface module which is capable of accepting user commands via an input device and providing user directives to an appropriate one of the other modules for implementation.

14. The system of claim 13, wherein the displayable image provided by the 3D rendering module depicts only a portion of the scene available for rendering from the decoded panoramic video data at any one time, and wherein the user interface module accepts user commands specifying a viewing direction defining the portion of the scene the user wants to view on said display and provides this information to the 3D rendering module, said 3D rendering module thereafter providing a displayable image to the display module representing the portion of the scene specified by the user.

15. The system of claim 13, wherein the displayable image provided by the 3D rendering module depicts only a portion of the scene available for rendering from the decoded panoramic video data at any one time, and wherein the user interface module accepts user commands specifying a zoom setting defining the portion of the scene the user wants to view on said display and provides this information to the 3D rendering module, said 3D rendering module thereafter providing a displayable image to the display module representing the portion of the scene specified by the user.

16. The system of claim 13, wherein the user interface module accepts user commands specifying what panoramic video the user wants to view on said display and provides this information to the decoder module, said decoder module communicating with the source to obtain encoded panoramic video data corresponding to the user-specified panoramic video in response to the user command.

17. The system of claim 13, wherein the user interface module accepts user commands specifying that the displaying of the panoramic video be paused and provides this information to the decoder module, said decoder module temporarily suspending the input of the encoded panoramic video data in response to the user-specified pause command.

18. The system of claim 17, wherein the user interface module accepts user commands specifying that the displaying of the panoramic video, which had previously been paused, be resumed and provides this information to the decoder module, said decoder module communicating with the source to obtain encoded panoramic video data corresponding to the panoramic video once again in response to the user resume command.

19. The system of claim 13, wherein the user interface module accepts user seek-in-time commands specifying a place in time within the panoramic video sequence that the user wants to view on said display and provides this information to the decoder module, said decoder module communicating with the source to obtain encoded panoramic video data corresponding to particular frames or groups of consecutive frames of the panoramic video associated with the user-specified place in time within the panoramic video in response to the user's seek-in-time command.

20. The system of claim 13, wherein the source of the inputted encoded panoramic video data is via a server over a network connection.

21. The system of claim 13, wherein the source of the inputted encoded panoramic video data is via a storage medium directly accessible by the decoder module.

22. A process for viewing panoramic videos, comprising the process actions of:
   maintaining two-way communications with a source of encoded video data, said encoded video data representing sequential frames of a panoramic video;
   decoding said encoded panoramic video data;
   producing displayable images from the decoded panoramic video data by mapping the data onto a prescribed 3D environment model; and
   displaying each displayable image.

23. The process of claim 22, wherein the process action of producing displayable images comprises an action of producing a displayable image every time sufficient panoramic video data is decoded to represent a frame of the panoramic video.

24. The process of claim 22, further comprising process actions of:
   storing the decoded panoramic video data each time sufficient data is decoded to represent a frame of the panoramic video; and
   making said stored panoramic video data available for producing a displayable image.

25. The process of claim 24, wherein the process action of storing comprises an action of replacing previously stored panoramic video data with newly decoded panoramic video data.

26. The process of claim 22, further comprising performing, prior to performing the process action of decoding the encoded panoramic video data, a process action of inputting an initialization data file comprising the encoded panoramic video data associated with the frames of the panoramic video.

27. The process of claim 26, wherein the initialization data file further comprises an indication of the order in which the frames of the panoramic video are to be decoded and viewed.

28. The process of claim 22, further comprising performing, prior to performing the process action of decoding the encoded panoramic video data, the process actions of:
   inputting an initialization data file comprising information on how to obtain encoded panoramic video data associated with the frames of the panoramic video; and
   obtaining the encoded panoramic video data associated with the frames of the panoramic video using the information provided in the initialization data file.

29. The process of claim 28, wherein the encoded panoramic video data associated with the frames of the panoramic video is resident in a directly accessible storage medium and the information on how to obtain the encoded panoramic video data comprises the identity of locations in said storage medium associated with the data, and wherein the process action of obtaining the encoded video data comprises an action of reading the data from the identified locations in the storage medium.

30. The process of claim 29, wherein the initialization data file further comprises an indication of the order in which the frames of the panoramic video are to be decoded and viewed, and wherein the process action of obtaining the encoded panoramic video data comprises an action of reading the data from the identified locations in the storage medium in the order indicated in the initialization data file.

31. The process of claim 28, wherein the encoded panoramic video data associated with the frames of the panoramic video is provided via a server over a network connection and the information on how to obtain the encoded panoramic video data comprises identifiers for identifying the data, and wherein the process action of obtaining the encoded panoramic video data comprises an action of identifying the data received over the network using said identifiers.

32. The process of claim 31, wherein the initialization data file further comprises an indication of the order in which the frames of the panoramic video are to be decoded and viewed, and wherein the process action of obtaining the encoded panoramic video data comprises an action of identifying the data in the order indicated in the initialization data file.

33. The process of claim 22, further comprising a process action of providing static texture data representing one or more regions of said environment model not represented by the panoramic video data, and wherein the process action of producing displayable images comprises an action of using the static texture data as an addendum to the panoramic video data associated with each frame of the panoramic video to depict said one or more regions of the environment model not represented by the panoramic video data for that frame.

34. The process of claim 22, wherein the process action of producing displayable images comprises an action of inserting an image of an object into the scene represented by the panoramic video data associated with a frame of the panoramic video which was not in the scene before.

35. The process of claim 33, wherein the process action of producing displayable images comprises an action of inserting an image of an object into the scene represented by the static texture data associated with a frame of the panoramic video which was not in the scene before.

36. The process of claim 22, wherein the process action of producing displayable images comprises an action of producing displayable images that depict a prescribed portion of the scene available from the decoded panoramic video data.

37. The process of claim 22, further comprising the process actions of:
   monitoring for inputted user commands; and wherein whenever a user command is received,
   determining if the received command is a video selection command specifying what panoramic video, among those available, the user wants displayed,
   whenever it is determined that the received command is a video selection command, communicating with the source and obtaining therefrom encoded panoramic video data associated with the user-specified panoramic video,
   whenever it is determined that the received command is not a video selection command, determining if the received command is a pause command, whenever it is determined that the received command is a pause command, temporarily suspending the transfer of the panoramic video data from the source and thereafter monitoring for a user-specified play command, and once a play command is received, communicating with the source to begin the inputting of the encoded panoramic video data once again, whenever it is determined that the received command is not a pause command, determining if the received command is a seek-in-time command specifying a place in time within the panoramic video that the user wants displayed, and
   whenever it is determined that the received command is a seek-in-time command, communicating with the source and obtaining therefrom encoded panoramic video data corresponding to particular frames or groups of consecutive frames of the panoramic video associated with the user-specified place in time within the panoramic video.

38. The process of claim 37, wherein the process action of producing displayable images comprises an action of producing displayable images that depict only a portion of the scene available from the decoded panoramic video data at any one time, and wherein whenever a user command is received,
   determining if the received command is a panning command specifying a viewing direction defining a portion of the scene the user wants displayed,
   whenever it is determined that the received command is a panning command, the process action of producing displayable images comprises an action of providing displayable images that depict only that portion of the scene specified by the user panning command, whenever it is determined that the received command is not a panning command, determining if the received command is a zoom command specifying a scale defining a portion of the scene the user wants displayed, and whenever it is determined that the received command is a zoom command, the process action of producing displayable images comprises an action of providing displayable images that depict only that portion of the scene specified by the user zoom command.

39. A system for viewing a panoramic video, comprising:

a decoder module that is in two-way communication with a source of encoded video data, and which inputs encoded panoramic video data representing a portion of each frame of the panoramic video from the source and outputs a decoded version thereof;

a 3D rendering module capable of mapping texture data associated with the decoded panoramic video data onto a prescribed 3D environment model to render a displayable image of said portion of each frame of the panoramic video; and a display module capable of displaying each displayable image rendered by the 3D rendering module.

40. The system of claim 39, further comprising a storage module which is capable of storing the decoded panoramic video data output from the decoder module and making the data accessible to the 3D rendering module.

41. The system of claim 40, wherein each time the decoder module decodes a sufficient amount of the encoded panoramic video data to represent said portion of a frame of the panoramic video, it provides that data to the storage module, and wherein the storage module stores only said encoded panoramic video data representing said portion of a frame of the panoramic video at any one time.

42. The system of claim 39, further comprising an initialization module which is capable of storing an initialization data file comprising information on how to obtain the encoded panoramic video data associated with the frames of the panoramic video, said initialization module being accessible by the decoder module.

43. The system of claim 42, wherein the decoder module obtains the encoded panoramic video data associated with a portion of each frame of the panoramic video using the information provided in the initialization data file.

44. The system of claim 43, wherein the encoded panoramic video data associated with the portion of each frame of the panoramic video is provided via a server over a network connection and the information on how to obtain the encoded panoramic video data comprises identifiers for identifying the data associated with segments of each frame of the panoramic video, and wherein the decoder module obtains the encoded panoramic video data associated with a desired portion of each frame of the panoramic video by identifying the segments corresponding to that portion using said identifiers.

45. The system of claim 44, further comprising a user interface module which is capable of accepting user commands and providing user directives to an appropriate one of the other modules for implementation.

46. The system of claim 45, wherein the user interface module accepts user commands specifying a viewing direction defining the portion of the scene the user wants to view on said display, and wherein the decoder module communicates with the source and using said identifiers identifies one or more segments of each frame that are to be transferred to the decoder module over the network connection to obtain the encoded panoramic video data representing the desired portion of the scene specified by the user.

47. The system of claim 48, wherein the decoder module communicates with the source and identifies one or more segments of each frame that are to be transferred to the decoder module over the network connection on a standing order basis such that once the decoder module identifies one or more segments of each frame, the same segment or segments of each consecutive frame of the panoramic video are transferred to the decoder module until the decoder module identifies another segment or segments to be transferred for subsequent frames.

48. The system of claim 46, wherein user commands specifying a viewing direction defining the portion of the scene the user wants to view are provided to the 3D rendering module, which in turn provides this information to the decoder module.

49. The system of claim 43, wherein the encoded panoramic video data associated with each frame of the panoramic video is provided via a server over a network connection and the information on how to obtain the encoded panoramic video data associated with a desired portion of each frame comprises identifiers for identifying the data associated with segments of each frame of the panoramic video, and wherein the decoder module obtains the encoded panoramic video data associated with the desired portion of each frame of the panoramic video by identifying the segments corresponding to that portion using said identifiers before decoding the identified segments.

50. The system of claim 49, further comprising a user interface module which is capable of accepting user commands and providing user directives to an appropriate one of the other modules for implementation.

51. The system of claim 50, wherein the user interface module accepts user commands specifying a viewing direction defining the portion of the scene the user wants to view and provides this information to the 3D rendering module, which in turn provides it to the decoder module, and wherein the decoder module identifies one or more segments of each frame representing the desired portion of the scene specified by the user using said identifiers before decoding the identified segments.

52. The system of claim 43, wherein the encoded panoramic video data associated with the portion of each frame of the panoramic video is resident in a directly accessible storage medium and the information on how to obtain the encoded panoramic video data comprises the identity of locations in said storage medium associated with segments of each frame of the panoramic video, and wherein the decoder module obtains the encoded panoramic video data associated with the desired portion of each frame of the panoramic video by reading the segments corresponding to that portion from the identified locations in the storage medium.

53. The system of claim 52, further comprising a user interface module which is capable of accepting user commands and providing user directives to an appropriate one of the other modules for implementation.

54. The system of claim 53, wherein the user interface module accepts user commands specifying a viewing direction defining the portion of the scene the user wants to view and provides this information to the 3D rendering module, which in turn provides it to the decoder module, and wherein the decoder module reads the one or more segments of each frame that are needed to obtain the encoded panoramic video data representing the desired portion of the scene specified by the user.

55. The system of claim 39, wherein the encoded panoramic video data comprises an audio component associated with each frame of the panoramic video, and wherein the decoder module comprises a splitter module which extracts said audio component from the data associated with each frame of the panoramic video.

56. The system of claim 55, further comprising an audio module which is capable of receiving the extracted audio component and playing audio derived from the audio component whenever any portion of the frame of the panoramic video to which the audio component is associated is displayed by the display module.

57. The system of claim 39, wherein the encoded panoramic video data comprises audio data associated with each of said portions of each frame of the panoramic video, and wherein the decoder module comprises a splitter module which extracts said audio data.

58. The system of claim 57, further comprising an audio module which is capable of receiving the extracted audio data and playing audio derived from the audio data associated with the portion of a panoramic video frame that is displayed by the display module.

59. The system of claim 58, wherein whenever a displayable image displayed by the display module is rendered from texture data associated with more than one said portions of a panoramic video frame, the audio data associated with each of the portions of the panoramic video frame rendered to produce the displayable image is blended and audio derived from the blended audio data is played.

60. A system for viewing panoramic videos, comprising:

a general purpose computing device;

a computer program comprising program modules executable by the computing device, wherein the computing device is directed by the program modules of the computer program to,
- maintain two-way communications with a source of encoded video data, said encoded video data representing sequential frames of a panoramic video;
- decode said encoded panoramic video data;
- produce displayable images from the decoded panoramic video data by mapping the data onto a prescribed 3D environment model; and
- display each displayable image.

61. A computer-readable medium having computer-executable instructions for enabling the viewing of panoramic videos, said computer-executable instructions comprising:

maintaining two-way communications with a source of encoded video data, said encoded video data representing a portion of each frame of the panoramic video;

decoding said inputted panoramic video data;

mapping texture data associated with the decoded panoramic video data onto a prescribed 3D environment model to render a displayable image of said portion of each frame of the panoramic video; and displaying each displayable image.

* * * * *

UNITED STATES PATENT AND TRADEMARK OFFICE
CERTIFICATE OF CORRECTION

PATENT NO.    : 6,559,846 B1                                              Page 1 of 1
DATED         : May 6, 2003
INVENTOR(S)   : Matthew T. Uyttendale and Richard S. Szeliski It is certified that error appears in the above-identified patent and that said Letters Patent is hereby corrected as shown below:

<u>Column 22,</u>
Line 6, "claim 48" should be changed to -- claim 46 --

Signed and Sealed this

Second Day of September, 2003

JAMES E. ROGAN
*Director of the United States Patent and Trademark Office*